United States Patent
Matthews (10) Patent No.: US 6,915,044 B2
(45) Date of Patent: Jul. 5, 2005

(54) TUNABLE TALBOT INTERFEROMETERS FOR FIBER BRAGG GRATING WRITING

(75) Inventor: Michael R. Matthews, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 76 days.

(21) Appl. No.: 10/619,776

(22) Filed: Jul. 15, 2003

(65) Prior Publication Data

US 2005/0012933 A1 Jan. 20, 2005

(51) Int. Cl.⁷ ................................................. G02B 6/34
(52) U.S. Cl. ............................ 385/37; 385/10; 385/14; 385/15; 359/570
(58) Field of Search ......................... 385/37, 10, 3, 385/6, 14, 15, 25, 18, 33, 39; 359/570

(56) References Cited

U.S. PATENT DOCUMENTS

| | | | |
|---|---|---|---|
| 4,807,950 A | * 2/1989 | Glenn et al. | 385/123 |
| 5,388,173 A | 2/1995 | Glenn | |
| 5,694,248 A | * 12/1997 | Erdogan et al. | 359/570 |
| 5,822,479 A | * 10/1998 | Napier et al. | 385/37 |
| 5,841,570 A | * 11/1998 | Velsko | 359/330 |
| 6,414,764 B1 | * 7/2002 | Ouellette | 359/35 |
| 6,490,390 B1 | 12/2002 | Wilcox | |
| 6,542,228 B1 | * 4/2003 | Hartog | 356/73.1 |
| 6,548,225 B1 | * 4/2003 | Hammon et al. | 430/321 |
| 6,690,474 B1 | * 2/2004 | Shirley | 356/603 |

FOREIGN PATENT DOCUMENTS

| | | |
|---|---|---|
| EP | 0 872 752 A1 | 10/1998 |
| WO | WO 99/63371 A1 | 12/1999 |
| WO | WO 01/06280 A1 | 1/2001 |
| WO | WO 02/071113 A1 * | 9/2002 ............ G02B/6/16 |
| WO | WO 02/071114 A1 | 9/2002 |
| WO | WO 02/091531 A1 | 11/2002 |

OTHER PUBLICATIONS

Y.Wang, et al; "Modified Talbot Interferometer for Fabrication of Fiber–Optic Grating Filter Over a Wide Range of Bragg Wavelength and Bandwidth Using a Single Phase Mask", *Journal of Lightwave Technology* (Oct. 2001); vol. 19, No. 10; pp. 1569–1573.

* cited by examiner

Primary Examiner—K Cyrus Kianni
(74) Attorney, Agent, or Firm—Gregg H. Rosenblatt (57) ABSTRACT

A tunable interferometer for creating gratings of variable periodicity in an optical waveguide is disclosed. The interferometer includes a beam splitter for producing first and second write beams from an input beam. First and second reflectors receive the first and second write beams, respectively, from the beam splitter and direct the first and second write beams to intersect at a fixed location. The angle of intersection of the first and second write beams is a function of impingement locations of the first and second write beams on the first and second reflectors. The impingement locations of the first and second write beams on the first and second. reflectors may be varied to vary the angle of intersection at the fixed location.

17 Claims, 5 Drawing Sheets

TUNABLE TALBOT INTERFEROMETERS FOR FIBER BRAGG GRATING WRITING

FIELD

The present invention relates generally to the fabrication of Bragg gratings. More specifically, the present invention relates to the fabrication of Bragg gratings in optical fibers or waveguides using an interferometer.

BACKGROUND

Optical fibers are long, thin strands of very pure glass which are used to transmit light signals over long distances. Each optical fiber typically has three parts: a core, a cladding, and a buffer coating. The core is the thin glass center of the fiber where the light travels. The cladding is the outer optical material surrounding the core that reflects the light back into the core because it has an index of refraction less than that of the inner core. The buffer coating is a polymer coating that protects the fiber from damage and moisture. Large numbers of these optical fibers can be arranged in bundles to form optical cables.

A fiber grating is a periodic or aperiodic perturbation of the effective absorption coefficient and/or the effective refractive index of an optical waveguide. It can reflect a predetermined narrow or broad range of wavelengths of light incident on the grating, while passing all other wavelengths of light. Fiber gratings are useful as, for example, filters for wavelength division multiplexing (WDM), gain flattening filters for optical amplifiers, and stabilizers for laser diodes used to pump optical amplifiers.

Typically, fiber gratings are made by laterally exposing the core of a single-mode fiber to a periodic pattern of intense ultraviolet light. The exposure produces a permanent increase in the refractive index of the fiber's core, creating a fixed index modulation according to the exposure pattern. This fixed index modulation is called a grating. At each periodic refraction change, a small amount of light is reflected. All the reflected light signals combine coherently to one large reflection at a particular wavelength when the grating period is approximately half the input light's wavelength. This is referred to as the Bragg condition, and the wavelength at which this reflection occurs is called the Bragg wavelength.

Light signals at wavelengths other than the Bragg wavelength, which are not phase matched, are essentially transparent to the grating. Therefore, light propagates through the grating with negligible attenuation or signal variation. Only those wavelengths that satisfy the Bragg condition are affected and strongly back-reflected. The ability to accurately preset and maintain the grating wavelength is a fundamental feature and advantage of fiber Bragg gratings.

As is known, a grating can be produced by using an interferometer to cause two or more nominally plane optical waves (write beams) to interfere within the core of the fiber, thereby producing an interference pattern therein. The plane containing the fiber, and orthogonal to the plane containing the write beams, we refer to as the focal plane. The period of a fiber Bragg grating formed by an interferometer can be described by the well-known Bragg equation $$2n\Lambda \sin \theta = m\lambda \qquad (Eq. 1)$$

where $\Lambda$ is the grating period, $\theta$ is the half-angle between the write beams, m is an integer, $\lambda$ is the wavelength of the write beams used to form the grating, and n is the index of refraction. The period of a grating need not be uniform. A change in the period of the grating as a function of position along the grating is known as chirp. Chirped gratings reflect different wavelengths at different points along the grating as dictated by Equation 1. As can be seen in this equation, the grating period can be tuned by either varying the write wavelength or the inter-beam angle between the write beams.

In the latter approach, a problem with conventional fabrication methods of fiber Bragg gratings is the inability to change the period of the grating during the fabrication process without changing the position at which the write beams overlap in space or where the fiber is located with respect to these interfering beams.

BRIEF SUMMARY

Thus, the need remains for an interferometer, which allows for smooth and continuous changes in the period of a fiber Bragg grating during fabrication without repositioning the fiber or the overlap position of the beams.

The present invention is a tunable interferometer for creating gratings of variable periodicity in an optical waveguide. The first exemplary embodiment of the current invention is a tunable interferometer comprising a beam splitter for producing first and second write beams from an input beam, first and second reflectors for receiving the first and second write beams, respectively, from the beam splitter and directing the first and second write beams to intersect at a fixed location with an angle of intersection which is a function of impingement locations of the first and second write beams on the first and second reflectors, respectively, and means for varying the impingement locations of the first and second write beams on the first and second reflectors.

A second exemplary embodiment of the current invention is a system for creating gratings having interference patterns of variable periodicity in an optical waveguide comprising a light source for providing an input beam, a beam splitter for producing first and second write beams from the input beam, first and second fixed reflectors for receiving the first and second write beams, respectively, from the beam splitter and directing the first and second write beams to intersect at a fixed location with an angle of intersection which is a function of impingement locations of the first and second write beams on the first and second fixed reflectors, and a tuning element for varying a point of impingement of the input beam on the beam splitter to vary the impingement locations of the first and second write beams on the first and second fixed reflectors.

A third exemplary embodiment of the present invention is a method for creating gratings of variable periodicity in an optical waveguide method comprising producing first and second write beams from an input beam, directing the first and second write beams to intersect at a fixed location with an angle of intersection which is a function of an impingement location of the input beam on a beam splitter, and varying a point of impingement of the input bean on the beam splitter to vary the angle of intersection of the first and second write beams, thereby altering the periodicity of the interference pattern in the optical waveguide.

BRIEF DESCRIPTION OF THE DRAWINGS

FIG. 1b is a side view of the tunable interferometer shown in FIG. 1a.

FIG. 2b is a side view of the tunable interferometer shown in FIG. 2a.

DETAILED DESCRIPTION

In each of the interferometers shown in the Figures, two optical paths, labeled A and B, are shown to illustrate how different inter-beam angles are achieved for the various embodiments described herein. Path A is shown in solid lines, while path B is shown in dashed lines.

Figure 1A:
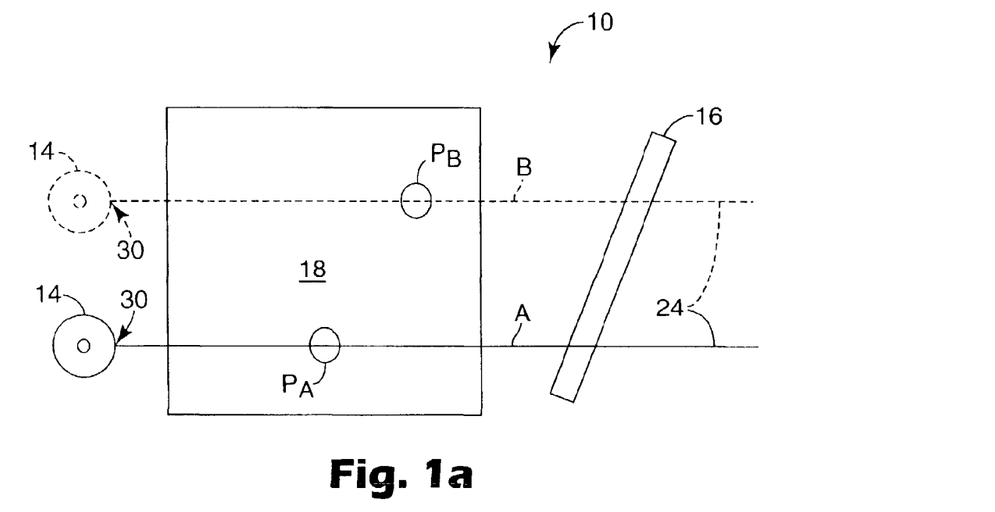
FIG. 1a is a top view of an exemplary tunable interferometer for creating gratings of variable periodicity in an optical waveguide including a tilted phase mask.
Figure 1B:
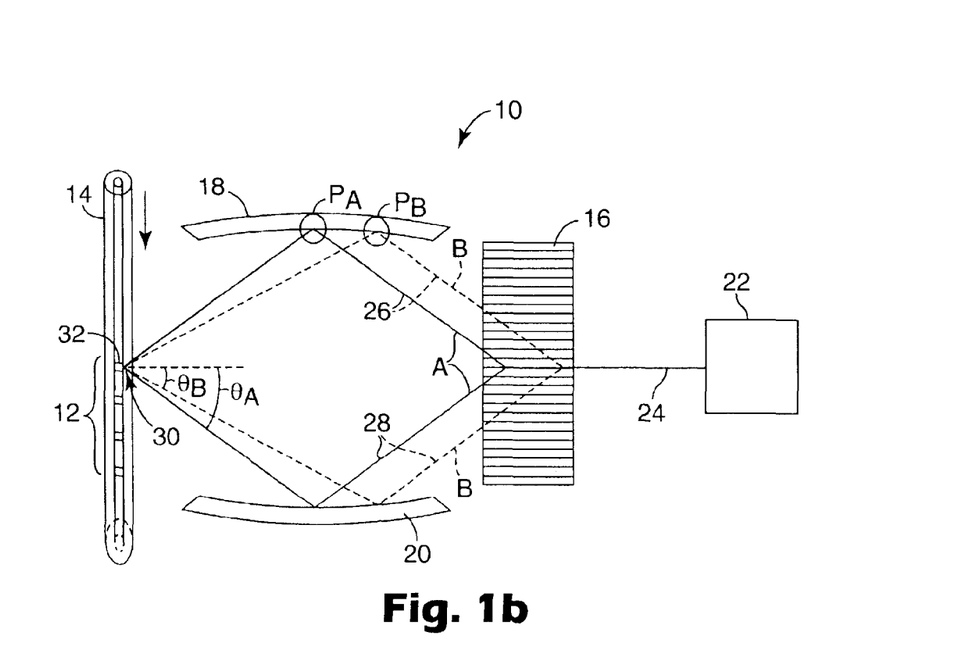

FIG. 1a is a top view and FIG. 1b is a side view of tunable interferometer 10 including tilted phase mask 16 for creating gratings 12 of variable periodicity or chirp in optical waveguide 14. Interferometer 10 also includes first curved reflector 18 and second curved reflector 20.

Light source 22, which is preferably a source of actinic radiation such as a laser, produces input beam 24. Tilted phase mask 16 splits input beam 24 into two writing beams: first write beam 26 and second write beam 28. A phase mask is a diffractive optical element used to split an input beam into two diffraction orders, +1 and −1, with an equal power level. Thus, input beam 24 is split such that half of input beam 24 is transmitted from phase mask 16 as first write beam 26 and half of input beam 24 is transmitted from phase mask 16 as second write beam 28. This split beam is shown as optical paths A and B in FIGS. 1a and 1b. Other ratios of transmitted light are possible as design requirements dictate. Phase mask 16 may also be replaced with a beam splitter to split input beam 24 into two write beams 26 and 28.

First write beam 26 is directed to optical waveguide 14 via first curved reflector 18, and second write beam 28 is directed to optical waveguide 14 via second curved reflector 20. First curved reflector 18 and second curved reflector 20 preferably have parabolic surfaces of incidence. The angle of incidence of first write beam 26 and second write beam 28 on optical waveguide 14 is based on the point and angle of incidence of first write beam 26 on first curved reflector 18 and of second write beam 28 on second curved reflector 20. To illustrate, the point of incidence of first write beam 26 on first curved reflector 18 along path A is shown as point $P_A$ in FIGS. 1a and 1b. First write beam 26 and second write beam 28 are reflected from first curved reflector 18 and second curved reflector 20, respectively, toward optical waveguide 14 at an inter-beam half angle, $\theta_A$. First write beam 26 and second write beam 28 intersect at focal plane 30 and interfere with each other at region 32 in the core of optical waveguide 14, thereby producing an interference pattern therein. For example, first curved reflector 18 may have a parabolic surface, such that the intersection point at focal plane 30 is at the focal point of the reflector and the optic axis is parallel to the incident rays of the first write beam 26. Similarly, second curved reflector 20 may have a parabolic surface, such that the intersection point at focal plane 30 is at the focal point of the reflector and the optic axis is parallel to the incident rays of second write beam 28. The intersection of the first and second write beams 26, 28 produce an interference pattern. Exposure of an optical fiber having a photosensitive core to this pattern of light produces a permanent increase in the refractive index of the fiber's core, creating a fixed index modulation, or grating 12.

As discussed above, the periodicity of the fixed index modulation is a function of the wavelength of input beam 24 of the interferometer and of the inter-beam half angle between first write beam 26 and second write beam 28, pursuant to the Bragg equation (Eq. 1). Thus, to alter the periodicity of the grating, the inter-beam angle between first write beam 26 and second write beam 28 may be varied.

In interferometer 10, the inter-beam half angle $\theta_A$ of first write beam 26 and second write beam 28 at focal plane 30 may be varied by altering the point of incidence of input beam 24 on tilted phase mask 16. This is accomplished by translating phase mask 16 with respect to input beam 24, or by translating input beam 24 with respect to phase mask 16. This translational movement may be produced by, for example, mounting phase mask 16 or input beam 24 on a piezoelectrically controlled motorized platform.

As phase mask 16 and input beam 24 are moved relative to each other, input beam 24 is translated along the incident surface of phase mask 16. To illustrate the effect of translation of input beam 24 along phase mask 16, path B is shown in FIGS. 1a and 1b in dashed lines. This translation shifts the point of incidence of first write beam 26 on first curved reflector 18 and of second write beam 28 on second curved reflector 20. The translated point of incidence of first write beam 26 on first curved reflector 18 along path B is shown as point P3 in FIGS. 1a and 1b. As can be seen, translation of input beam 24 along tilted phase mask 16 results in a translation of first write beam 26 and second write beam 28 in two dimensions. As a result, a different inter-beam half angle, $\theta_B$, of first write beam 26 and second write beam 28 is produced. Pursuant to the Bragg equation (Eq. 1), this changes the periodicity of the grating written, without changing the location of focal plane 30. A chirped grating may be produced along optical waveguide 14 by moving input beam 24 relative to phase mask 16 as optical waveguide 14 is moved longitudinally relative to focal plane 30 while simultaneously manipulating, as is known in the art, the intensities of the first and second write beams. Phase mask 16 or input beam 24 may be moved to predetermined positions to create gratings having a specific periodicity. Alternatively, multiple gratings with different periods may be multiplexed at the same physical location in optical waveguide 14 to reflect multiple wavelengths by moving phase mask 16 and input beam 24 relative to each other while optical waveguide 14 remains stationary.

Figure 2A:
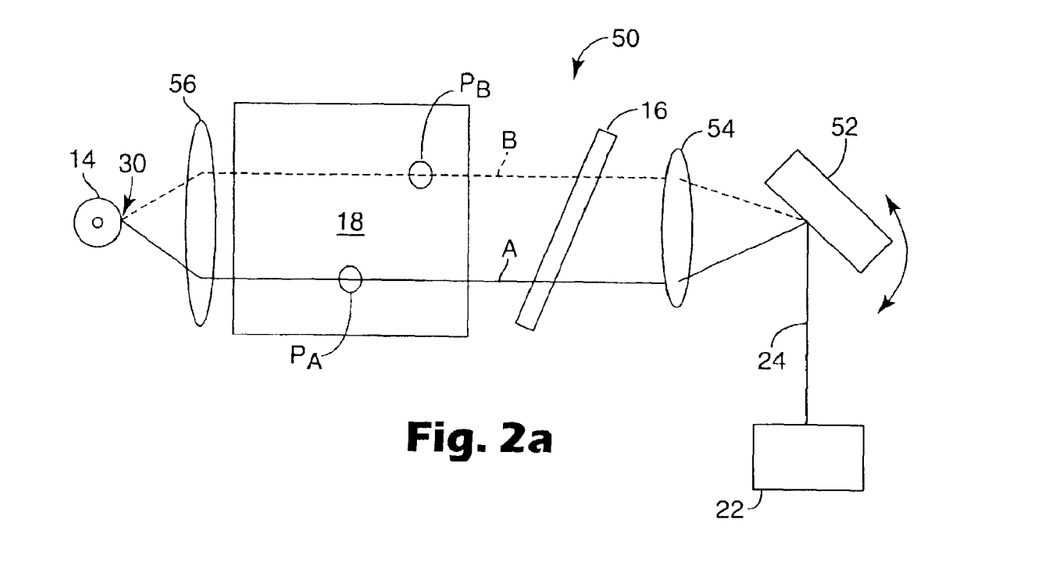
FIG. 2a is a top view of another exemplary tunable interferometer for creating gratings of variable periodicity in an optical waveguide including a tilted phase mask.
Figure 2B:
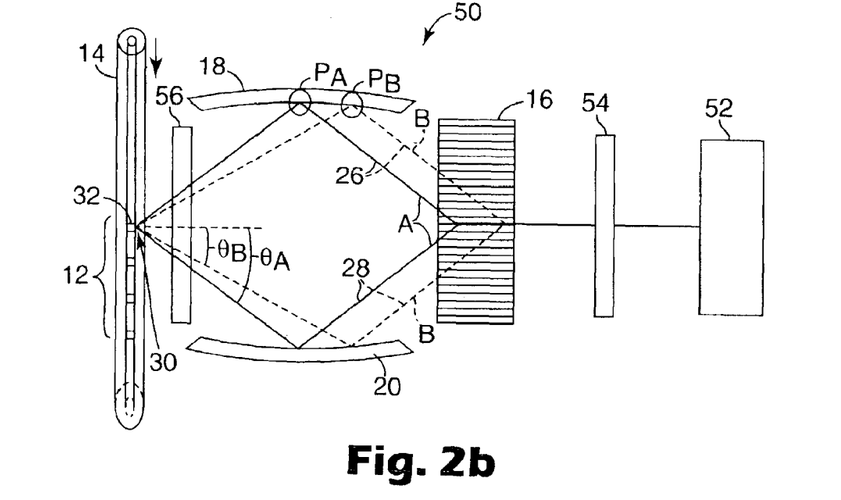

FIG. 2a is a top view and FIG. 2b is a side view of tunable interferometer 50 for creating gratings 12 of variable periodicity in optical waveguide 14. In addition to tilted phase mask 16, first curved reflector 18 and second curved reflector 20, interferometer 50 incorporates tilting mirror 52, collimating lens 54, and focusing lens 56.

In operation, light source 22 provides input beam 24, which is incident on tilting mirror 52. Input beam 24 is reflected from tilting mirror 52 to collimating lens 54. Collimating lens 54 redirects input beam 24 such that light at all possible beam angles incident on collimating lens 54 are made collinear. Tilted phase mask 16 splits input beam 24 into first write beam 26 and second write beam 28. This split beam is shown as optical paths A and B in FIGS. 2a and 2b. Input beam 24 is split such that half of input beam 24 is transmitted from phase mask 16 as first write beam 26 and half of input beam 24 is transmitted from phase mask 16 as second write beam 28. Other ratios of transmitted light are possible as design requirements dictate. Phase mask 16 may also be replaced with a beam splitter to split input beam 24 into two write beams.

First write beam 26 is directed to optical waveguide 14 via first curved reflector 18 and focusing lens 56. Similarly, second write beam 28 is directed to optical waveguide 14 via second curved reflector 20 and focusing lens 56. The angle of incidence of first write beam 26 and second write beam 28 on optical waveguide 14 is based on the point and angle of incidence of first write beam 26 on first curved reflector 18 and of second write beam 28 on second curved reflector 20. To illustrate, the point of incidence of first write beam 26 on first curved reflector 18 along path A is shown as point $P_A$ in FIGS. 2a and 2b. First write beam 26 and second write beam 28 are reflected from first curved reflector 18 and second curved reflector 20, respectively, to focusing lens 56. First write beam 26 and second write beam 28 are reflected from first curved reflector 18 and second curved reflector 20, respectively, toward optical waveguide 14 at an inter-beam half angle, $\theta_A$. An advantage of including focusing lens 56 is that first write beam 26 and second write beam 28 interfere at focal plane 30 in a fixed location, regardless of the points of incidence of write beams 26 and 28 on curved reflectors 18 and 20, respectively. First write beam 26 and second write beam 28 intersect at focal plane 30 and interfere with each other at region 32 in the core of optical waveguide 14, thereby producing an interference pattern therein.

In interferometer 50, the inter-beam half angle $\theta_A$ of first write beam 26 and second write beam 28 at focal plane 30 may be varied by altering the point of incidence of input beam 24 on tilted phase mask 16. In the embodiment shown in FIGS. 2a and 2b, this is accomplished by rotating tilting mirror 52 about the point of incidence of input beam 24 on tilting mirror 52. By rotating tilting mirror 52, input beam 24 is translated along the incident surface of phase mask 16 via collimating lens 54. Rotation of tilting mirror 52 may be produced by, for example, mounting rotating mirror 52 on a piezoelectrically controlled motorized rotating platform.

As tilting mirror 52 is rotated, input beam 24 is translated along the incident surface of phase mask 16. To illustrate the effect of translation of input beam 24 along phase mask 16, path B is shown in FIGS. 2a and 2b in dashed lines. This translation shifts the point of incidence of first write beam 26 on first curved reflector 18 and of second write beam 28 on second curved reflector 20. The translated point of incidence of first write beam 26 on first curved reflector 18 along path B is shown as point $P_B$ in FIGS. 2a and 2b. As can be seen, translation of input beam 24 along tilted phase mask 16 results in a translation of first write beam 26 and second write beam 28 in two dimensions. As a result, a different inter-beam half angle, $\theta_B$, of first write beam 26 and second write beam 28 is produced. Pursuant to the Bragg equation (Eq. 1), this changes the periodicity of the grating written, without changing the location of focal plane 30. A chirped grating may be produced along optical waveguide 14 by moving input beam 24 relative to phase mask 16 as optical waveguide 14 is moved longitudinally relative to focal plane 30 while simultaneously manipulating, as is known in the art, the intensities of the first and second write beams. Tilting mirror 52 may be moved to predetermined positions to create gratings having a specific periodicity. Alternatively, multiple gratings with different periods may be multiplexed at the same physical location in optical waveguide 14 to reflect multiple wavelengths by moving tilting mirror 52 while optical waveguide 14 remains stationary.

Figure 3:
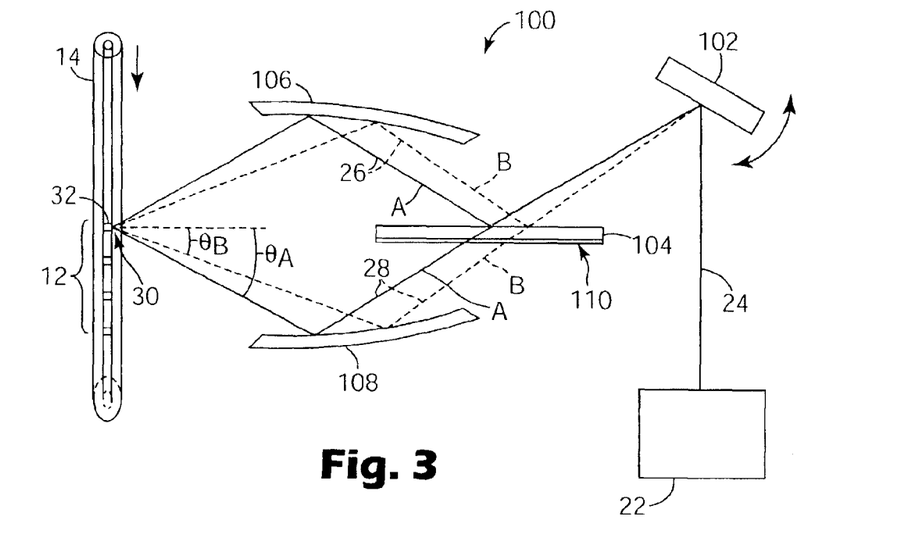
FIG. 3 is a side view of an exemplary tunable interferometer for creating gratings of variable periodicity in an optical waveguide including a tilting mirror and a beam splitter.

FIG. 3 is a side view of an exemplary tunable interferometer 100 for creating gratings 12 of variable periodicity in optical waveguide 14. Interferometer 100 includes tilting mirror 102, beam splitter 104, first curved reflector 106 and second curved reflector 108.

In operation, light source 22 provides input beam 24, which is reflected from tilting mirror 102 to beam splitter 104. Input beam 24 is incident on beam splitter 104, which splits input beam 24 into two write beams: first write beam 26 and second write beam 28. This split beam is shown as optical paths A and B in FIG. 3. Typically, input beam 24 is split such that 50% of input beam 24 is reflected from beam splitter 104 as first write beam 26 and 50% of input beam 24 is transmitted from beam splitter 104 as second write beam 28. Other ratios of transmitted and reflected light are possible as design requirements dictate. One side of beam splitter 104 is also preferably coated with anti-reflection coating 110 to prevent partial reflection of second write beam 28.

First write beam 26 is directed to optical waveguide 14 via first curved reflector 106. Similarly, second write beam 28 is directed to optical waveguide 14 via second curved reflector 108. First curved reflector 106 and second curved reflector 108 preferably have ellipsoidal surfaces of incidence. Alternatively, the first curved reflector 108 is an ellipsoidal mirror, such that one focus is at the intersection point at the focal plane 30, and the other focus is the same as the impingement point of the beam on tilting mirror 102. In this case, second curved reflector 106 is also an ellipsoidal mirror, such that one focus is at the intersection point at the focal plane 30, and the other focus is at the virtual image of the impingement point of the beam on tilting mirror 102.

The angle of incidence of first write beam 26 and second write beam 28 on optical waveguide 14 is based on the point and angle of incidence of first write beam 26 on first curved reflector 106 and of second write beam 28 on second-curved reflector 108. First write beam 26 and second write beam 28 are reflected from first curved reflector 106 and second curved reflector 108, respectively, toward optical waveguide 14 at an inter-beam half angle, $\theta_A$. First write beam 26 and second write beam 28 intersect at focal plane 30 and interfere with each other at region 32 in the core of optical waveguide 14, thereby producing an interference pattern therein. The shape of curved reflectors 106 and 108 allows first write beam 26 and second write beam 28 to reconverge at focal plane 30.

In interferometer 100, the inter-beam half angle $\theta_A$ of first write beam 26 and second write beam 28 at focal plane 30 may be varied by altering the point of incidence of input beam 24 on beam splitter 104. In the embodiment shown in FIG. 3, this is accomplished by rotating tilting mirror 102 about the point of incidence of input beam 24. By rotating tilting mirror 102, input beam 24 is translated along the incident surface of beam splitter 104. Rotation of tilting mirror 102 may be produced by, for example, mounting rotating mirror 102 on a piezoelectrically controlled motorized platform.

As tilting mirror 102 is rotated, input beam 24 is translated along the incident surface of beam splitter 104. The use of beam splitter 24 allows for angle changes of input beam 24 at the incident surface of beam splitter 104 to be propagated through interferometer 100. To illustrate the effect of translation of input beam 24 along beam splitter 104, path B is shown in FIG. 3 in dashed lines. This translation shifts the point of incidence of first write beam 26 on first curved reflector 106 and of second write beam 28 on second curved reflector 108. As a result, a different inter-beam half angle, $\theta_B$, of first write beam 26 and second write beam 28 is produced. Pursuant to the Bragg equation (Eq. 1), this changes the periodicity of the grating written, without changing the location of focal plane 30. A chirped grating may be produced along optical waveguide 14 by rotating tilting mirror 102 as optical waveguide 14 is moved longitudinally relative to focal plane 30 while simultaneously manipulating the intensities of the first and second write beams. Tilting mirror 102 may be moved to predetermined positions to create gratings having a specific periodicity. Alternatively, multiple gratings with different periods may be multiplexed at the same physical location in optical waveguide 14 to reflect multiple wavelengths by moving tilting mirror 102 while optical waveguide 14 remains stationary.

Figure 4:
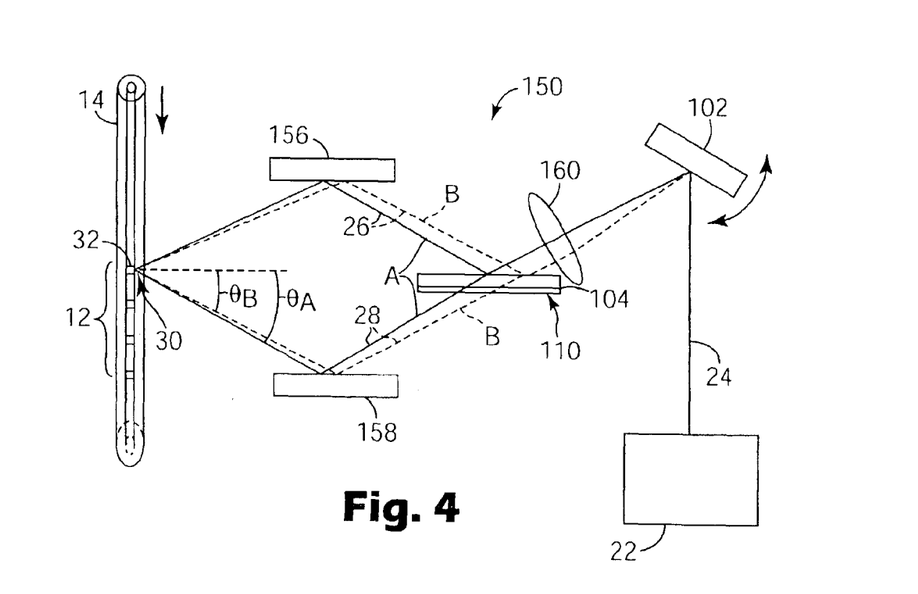
FIG. 4 is a side view of another exemplary tunable interferometer for creating gratings of variable periodicity in an optical waveguide including a tilting mirror and a beam splitter.

FIG. 4 is a side view of tunable interferometer 150 for creating gratings 12 of variable periodicity in optical waveguide 14. In addition to tilting mirror 102 and beam splitter 104, interferometer 150 includes planar reflectors 156 and 158. A lens 160 is also included between tilting mirror 102 and beam splitter 104.

The operation of interferometer 150 is similar to that of interferometer 100 in FIG. 3. Light source 22 produces input beam 24, which is reflected from tilting mirror 102 through lens 160 to beam splitter 104. Beam splitter 104 splits input beam 24 into two write beams: first write beam 26 and second write beam 28. This split beam is shown as optical paths A and B in FIG. 4. Typically, input beam 24 is split such that 50% of input beam 24 is reflected from beam splitter 104 as first write beam 26 and 50% of input beam 24 is transmitted from beam splitter 104 as second write beam 28. Other ratios of transmitted and reflected light are possible as design requirements dictate. One side of beam splitter 104 is also preferably coated with anti-reflection coating 110 to prevent partial reflection of second write beam 28.

First write beam 26 is directed to optical waveguide 14 via first planar reflector 156. Similarly, second write beam 28 is directed to optical waveguide 14 via second planar reflector 158. The area of incidence of first write beam 26 and second write beam 28 on optical waveguide 14 is based on the point of incidence of first write beam 26 on first planar reflector 156 and of second write beam 28 on second planar reflector 158. First write beam 26 and second write beam 28 are reflected from first planar reflector 156 and second planar reflector 158, respectively, toward optical waveguide 14 at an inter-beam half angle, $\theta_A$. Tilting mirror 102 is preferably positioned at twice the focal length of lens 160 from lens 160. Likewise, optical waveguide 14 is placed at twice the focal length of lens 160 from lens 160 such that first write beam 56 and second write beam 58 reconverge at optical waveguide 14 (FIG. 4 not to scale). First write beam 26 and second write beam 28 intersect at focal plane 30 and interfere with each other at region 32 in the core of optical waveguide 14, thereby producing an interference pattern therein.

In interferometer 150, the inter-beam half angle $\theta_A$ of first write beam 26 and second write beam 28 at focal plane 30 may be varied by altering the point of incidence of input beam 24 on beam splitter 104. This is accomplished by rotating tilting mirror 102 about the point of incidence of input beam 24. By rotating tilting mirror 102, input write beam 24 is translated along the incident surface of beam splitter 104. Rotation of tilting mirror 102 may be produced by, for example, mounting rotating mirror 102 on a piezoelectrically controlled motorized platform.

As tilting mirror 102 is rotated, input beam 24 is translated along the incident surface of beam splitter 104. To illustrate the effect of translation of input beam 24 along beam splitter 104, path B is shown in FIG. 4 in dashed lines. The incorporation of lens 160 allows the angle of incidence of input beam 24 from tilting mirror 102 to lens 160 to remain constant while translating the beam across the incident surface of beam splitter 104. This translation shifts the point of incidence of first write beam 26 on first planar reflector 156 and of second write beam 28 on second planar reflector 158. As a result, a different inter-beam half angle, $\theta_B$, of first write beam 26 and second write beam 28 is produced. Pursuant to the Bragg equation (Eq. 1), this changes the periodicity of the grating written, without changing the location of focal plane 30. A chirped grating may be produced along optical waveguide 14 by rotating tilting mirror 102 as optical waveguide 14 is moved longitudinally relative to focal plane 30 while simultaneously manipulating the intensities of the first and second write beams. Tilting mirror 102 may be moved to predetermined positions to create gratings having a specific periodicity. Alternatively, multiple gratings with different periods may be multiplexed at the same physical location in optical waveguide 14 to reflect multiple wavelengths by moving tilting mirror 102 while optical waveguide 14 remains stationary.

Figure 5:
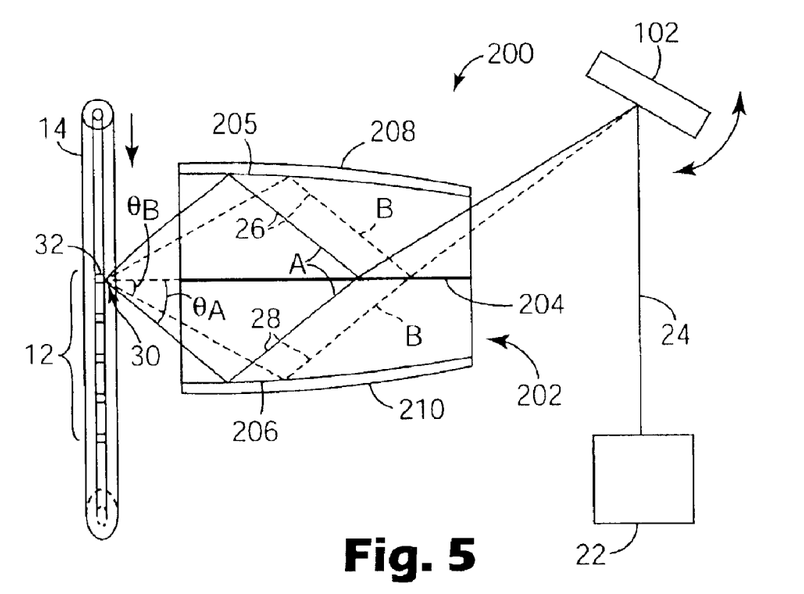
FIG. 5 is a side view of an exemplary tunable interferometer for creating gratings of variable periodicity in an optical waveguide including a tilting mirror and an integrated optical apparatus.

FIG. 5 is a side view of an exemplary tunable interferometer 200 for creating gratings 12 of variable periodicity in optical waveguide 14 including a tilting mirror 102 and an integrated optical apparatus 202. Optical apparatus 202 integrates beam splitter 204, first curved reflector 205 and second curved reflector 206 in a single structure. First curved reflector 205 is coated with highly reflective layer 208 on an outer surface. Similarly, second curved reflector 206 is coated with highly reflective layer 210 on an outer surface. Highly reflective layers 208 and 210 may be made of, for example, silver, aluminum or a dielectric multilayer.

The operation of interferometer 200 is similar to the operation of interferometer 100 shown in FIG. 3, but differs with respect to its structure. In interferometer 200, the beam splitter and the two curved reflectors are integrated into single structure, optical apparatus 202, which is an integrated beam splitter and beam combiner. Optical apparatus 202 is formed by shaping (by grinding, for example) a single piece of material to form beam splitter 204 and curved reflectors 205 and 206. Preferably, optical apparatus 202 is made of quartz, and beam splitter 204 is a 50/50 beam splitter. Furthermore, curved reflectors 205 and 206 preferably have ellipsoidal surfaces of incidence. Highly reflective layers 208 and 210 are distributed (by sputtering, for example) on the outer surfaces of curved reflectors 205 and 206, respectively. The addition of highly reflective layers 208 and 210 ensures high reflectivity of write beams 26 and 28 toward optical waveguide 14.

By combining curved reflectors 205 and 206 and beam splitter 204 in a single structure, stability between the paths of first write beam 26 and second write beam 28 is ensured, and tuning of the write beams is controlled by a single device. Furthermore, the single structure design reduces vibrations and thermal drift associated with discrete components, and allows for a smaller interferometer design, thereby reducing sensitivity to the surrounding environment.

In a preferred embodiment, tilting mirror 102 is mounted on a piezoelectric element. Alternatively, tilting mirror 102 may be replaced by a frequency adjustable acousto-optic modulator. These embodiments offer a very smooth response and high resolution for fine tunability of gratings 12.

Figure 6:
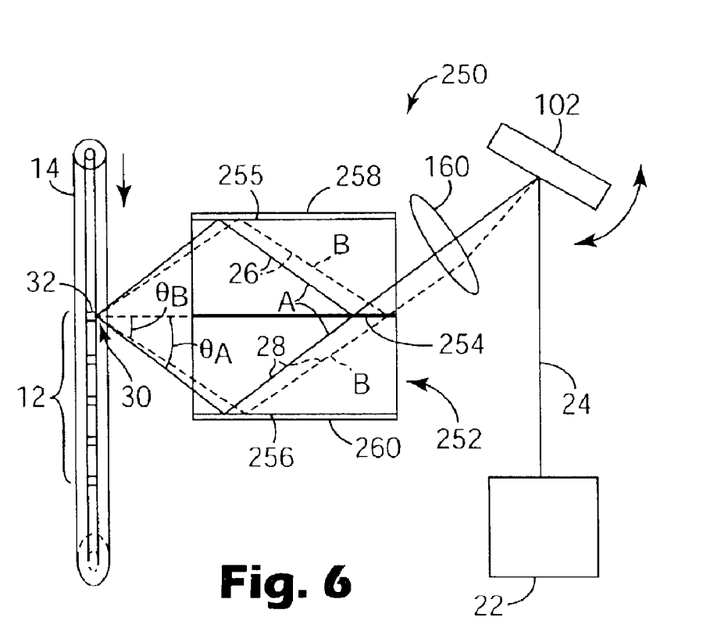
FIG. 6 is a side view of another exemplary tunable interferometer for creating gratings of variable periodicity in an optical waveguide including a tilting mirror and an integrated optical apparatus.

FIG. 6 is a side view of another exemplary tunable interferometer 250 for creating gratings 12 of variable periodicity in optical waveguide 14 including tilting mirror 102 and an integrated beam splitter/combiner optical apparatus 252. Optical apparatus 252 integrates beam splitter 254, first planar reflector 255 and second planar reflector 256 in a single structure. First planar reflector 255 is coated with highly reflective layer 258 on an outer surface. Similarly, second planar reflector 256 is coated with highly reflective layer 260 on an outer surface. Highly reflective layers 258 and 260 may be made of, for example, silver, aluminum or a dielectric multilayer. Lens 160 is positioned between tilting mirror 102 and optical apparatus 252.

The operation of interferometer 250 is similar to the operation of interferometer 150 shown in FIG. 4, but differs with respect to its structure. In interferometer 250, the beam splitter and the two planar reflectors are integrated into a single structure, optical apparatus 252. Optical apparatus 252 is formed by shaping (by grinding, for example) a single piece of material to form beam splitter 254 and planar reflectors 255 and 256. Preferably, optical apparatus 252 is made of quartz, and beam splitter 254 is a 50/50 beam splitter. The incorporation of lens 160 allows the angle of incidence of input beam 24 to remain constant while translating input beam 24 across the incident surface of beam splitter 254. Highly reflective layers 258 and 260 are distributed (by sputtering, for example) on the outer surfaces of planar reflectors 255 and 256, respectively. The addition of highly reflective layers 258 and 260 ensures high reflectivity of write beams 26 and 28 toward optical waveguide 14.

By combining planar reflectors 255 and 256 and beam splitter 254 in a single structure, stability between the paths of first write beam 26 and second write beam 28 is ensured, and tuning of the write beams is controlled by a single device. Furthermore, the single structure design reduces vibrations and thermal drift associated with discrete components, and allows for a smaller interferometer design, thereby reducing sensitivity to the surrounding environment.

In a preferred embodiment, tilting mirror 102 is mounted on a piezoelectric element. Alternatively, tilting mirror 102 may be replaced by a frequency adjustable acousto-optic modulator (see FIG. 7). These embodiments offer a very smooth response and high resolution for fine tunability of gratings 12.

Figure 7:
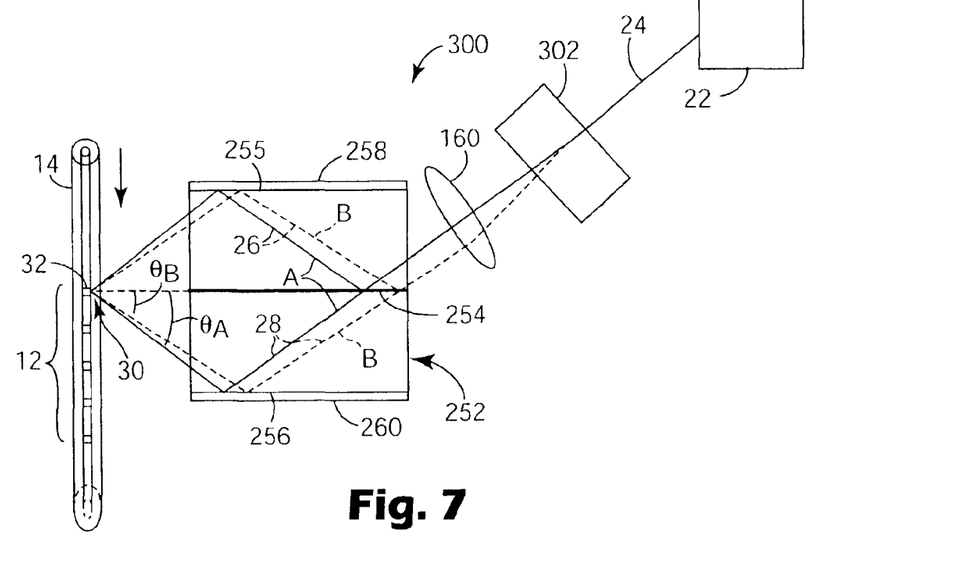
FIG. 7 is a side view of an exemplary tunable interferometer for creating gratings of variable periodicity in an optical waveguide including an acousto-optic modulator and an integrated optical apparatus.

FIG. 7 is a side view of an exemplary tunable interferometer 300 for creating gratings 12 of variable periodicity in optical waveguide 14 including acousto-optic modulator 302 and integrated beam splitter/combiner optical apparatus 252. Optical apparatus 252 integrates beam splitter 254, first planar reflector 255, and second planar reflector 256 in a single structure. First planar reflector 255 is coated with highly reflective layer 258 on an outer surface. Similarly, second planar reflector 256 is coated with highly reflective layer 260 on an outer surface. Highly reflective layers 258 and 260 may be made of, for example, silver, aluminum or a dielectric multilayer. Lens 160 is positioned between acousto-optic modulator 302 and optical apparatus 252.

The operation of interferometer 300 is similar to the operation of interferometer 150 shown in FIG. 4 and interferometer 250 shown in FIG. 6. In interferometer 300, tilting mirror 102 is replaced with acousto-optic modulator 302. As in the embodiment shown in FIG. 6, beam splitter 254 and planar reflectors 255 and 256 are integrated into a single structure, optical apparatus 252.

By combining planar reflectors 255 and 256 and beam splitter 254 in a single structure, stability between the paths of first write beam 26 and second write beam 28 is ensured, and tuning of the write beams is controlled by a single device. Furthermore, the single structure design reduces vibrations and thermal drift associated with discrete components, and allows for a smaller interferometer design, thereby reducing sensitivity to the surrounding environment.

Acousto-optic modulator 302 is chosen such that it has sufficient angle tuning ability and diffraction efficiency at the wavelength of light in use. The incorporation of lens 160 allows the angle of incidence of input beam 24 on beam splitter 254 to remain constant while translating input beam 24 across the incident surface of beam splitter 254. The optical path length between acousto-optic modulator 302 and lens 160 must be the same as the optical path length between lens 160 and optical waveguide 14 (FIG. 7 not to scale). Furthermore, the optical path length from lens 160 to optical waveguide 14 must be twice the focal length of lens 160. The use of acousto-optic modulator 302 allows angle tuning of both optical paths using the same device, thereby achieving smooth tuning.

As an example for interferometer 300, it is common to write gratings 12 in optical waveguide 14 using light at a wavelength of λ=244 nm. The intersection angle between write beams 26 and 28 required at optical waveguide 14 is given by $$\theta = \sin^{-1} \lambda/2d \qquad \text{Eq. 2)}$$

where d is the required spacing between the index fringes in fiber grating 12. For a grating written such that it reflects light near 1550 nm, the angle θ is approximately 0.02 radians (~11.45°). To provide tunability over, for example, 150 nm centered at 1550 nm (covering the conventional band, or C-band, a band often used in fabrication of gratings), the angle at the fiber must be changed by approximately 0.02 radians (~1.15°). This requires an angle change at acousto-optic modulator 302 of 0.01 radians (~0.573°), which is within the capabilities of many commercial devices.

Figure 8:
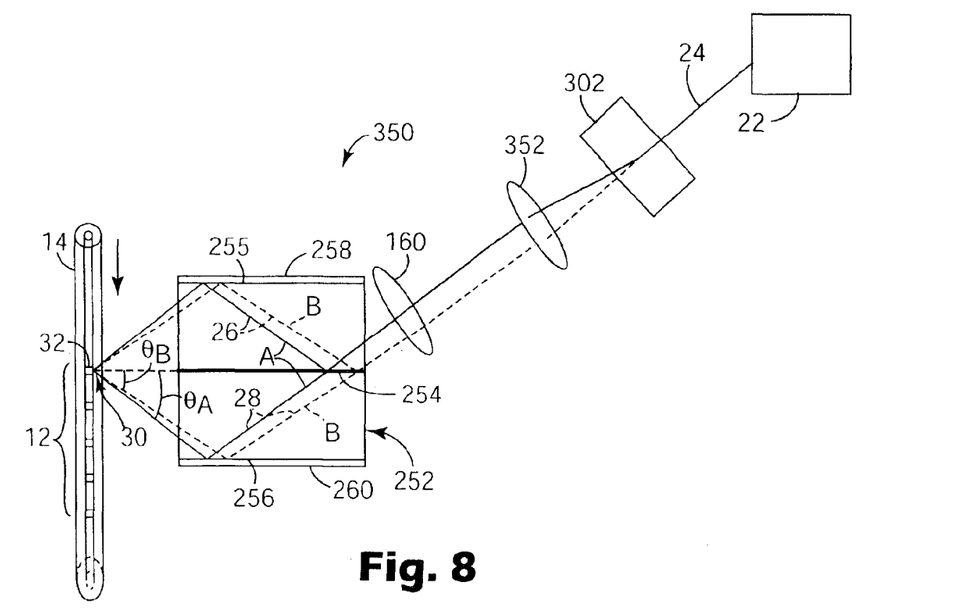
FIG. 8 is a side view of another exemplary tunable interferometer for creating gratings of variable periodicity in an optical waveguide including an acousto-optic modulator and an integrated optical apparatus.

FIG. 8 is a side view of another exemplary tunable interferometer 350 for creating gratings 12 of variable periodicity in an optical waveguide 14 including acousto-optic modulator 302 and integrated beam splitter/combiner optical apparatus 252. Optical apparatus 252 integrates beam splitter 254, first planar reflector 255 and second planar reflector 256 in a single structure. First planar reflector 255 is coated with highly reflective layer 258 on an outer surface. Similarly, second planar reflector 256 is coated with highly reflective layer 260 on an outer surface. Highly reflective layers 258 and 260 may be made of, for example, aluminum or a dielectric multilayer. Lenses 160 and 352 are positioned between acousto-optic modulator 302 and optical apparatus 252.

The operation of interferometer 350 is similar to the operation of interferometer 300 shown in FIG. 7. In interferometer 350, an additional lens 352 is added between acousto-optic modulator 302 and lens 160. Lens 352 is placed such that the optical path from acousto-optic modulator 302 to lens 352 is equal to the focal length of lens 352. Likewise, lens 160 is placed such that the optical path from lens 160 to optical waveguide 14 is equal to the focal length of lens 160 (FIG. 8 not to scale). The use of acousto-optic modulator 302 allows angle tuning of both optical paths using the same device, thereby achieving smooth tuning. Input beam 24 is collimated between lens 352 and lens 160, and all possible write beam angles produced by acousto-optic modulator 302 are made collinear between lenses 160 and 352. This enables a very large distance to be placed between lenses 160 and 352, offering greater flexibility in the design of interferometer 350.

In summary, the present invention is a tunable interferometer for creating gratings of variable periodicity in an optical waveguide. The interferometer includes a beam splitter for producing first and second write beams from an input beam. First and second fixed reflectors receive the first and second write beams, respectively, from the beam splitter and direct the first and second write beams to intersect at a fixed location. The angle of intersection of the first and second write beams is a function of impingement locations of the first and second write beams on the first and second fixed reflectors. A tuning element varies a point of impingement of the input beam on the beam splitter to vary the impingement locations of the first and second write beams on the first and second fixed reflectors.

Although the present invention has been described with reference to preferred embodiments, workers skilled in the art will recognize that changes may be made in form and detail without departing from the spirit and scope of the invention.

What is claimed is:

1. A tunable interferometer comprising:
a beam splitter for producing first and second write beams from an input beam;
first and second reflectors for receiving the first and second write beams, respectively, from the beam splitter and directing the first and second write beams to intersect at a fixed location with an angle of intersection which is a function of impingement locations of the first and second write beams on the first and second reflectors, respectively; and
means for varying the impingement locations of the first and second write beams on the first and second reflectors;
wherein the means for varying the impingement locations comprises a tuning element for varying a point of impingement of the input beam on the beam splitter to cause the impingement locations of the first and second write beams on the first and second reflectors to vary, wherein the first and second reflectors have fixed positions, and wherein the beam splitter and the first and second reflectors are integrated in a single structure.

2. The interferometer of claim 1, wherein the tuning element comprises a rotatable mirror.

3. The interferometer of claim 1, wherein the tuning element comprises an acousto-optic modulator capable of providing angle tuning of the input beam.

4. The interferometer of claim 1, further comprising at least one lens located between the tuning element and the beam splitter for directing the input beam from the tuning element to the beam splitter.

5. The interferometer of claim 1, wherein the beam splitter comprises a 50/50 beam splitter which transmits 50% of the input beam as the first write beam and reflects 50% of the input beam as the second write beam.

6. The interferometer of claim 1, wherein the first and second reflectors are curved reflectors.

7. The interferometer of claim 1, wherein the first and second reflectors are planar reflectors.

8. The interferometer of claim 1, wherein the input beam is a laser beam.

9. A system for creating gratings having interference patterns of variable periodicity in an optical waveguide, the system comprising:
a light source for providing an input beam;
a beam splitter for producing first and second write beams from the input beam;
first and second fixed reflectors for receiving the first and second write beams, respectively, from the beam splitter and directing the first and second write beams to intersect at a fixed location with an angle of intersection that is a function of impingement locations of the first and second write beams on the first and second fixed reflectors; and
a tuning element for varying a point of impingement of the input beam on the beam splitter to vary the impingement locations of the first and second write beams on the first and second fixed reflectors;
wherein the first and second fixed reflectors and the beam splitter are integrated in a single structure.

10. The system of claim 9, wherein the light source is a laser beam.

11. The system of claim 9, further comprising:
a device for causing relative longitudinal motion of the optical waveguide with respect to the fixed location to create chirped gratings.

12. The system of claim 9, wherein the tuning element is a rotating mirror mounted on a piezoelectric element.

13. The system of claim 9, wherein the tuning element is an acousto-optic modulator.

14. The system of claim 9, wherein the first and second fixed reflectors have a curved surface of incidence.

15. The system of claim 9, wherein the first and second fixed reflectors have a flat surface of incidence.

16. The system of claim 9, wherein the first and second fixed reflectors and the beam splitter are made of quartz.

17. The system of claim 16, wherein outer surfaces of the first and second fixed reflectors are coated with a reflective material.

* * * * *

UNITED STATES PATENT AND TRADEMARK OFFICE
CERTIFICATE OF CORRECTION

PATENT NO.    : 6,915,044 B2  
DATED         : July 5, 2005  
INVENTOR(S)   : Matthews, Michael R.

It is certified that error appears in the above-identified patent and that said Letters Patent is hereby corrected as shown below:

Column 2,
Line 57, delete "bean" and insert -- beam -- therefor.

Column 4,
Line 26, delete "periodicity-of" and insert -- periodicity of -- therefor.
Line 46, delete "P3" and insert -- $P_B$ --therefor.

Column 6,
Line 51, delete "second-curved" and insert -- second curved -- therefor.

Column 8,
Line 54, after "into" insert -- a --.

Signed and Sealed this

Thirteenth Day of September, 2005

JON W. DUDAS
*Director of the United States Patent and Trademark Office*